3,113,944
2,4,6-TRIALKYLPYRAZOLO[4,3-d]-4,5,6,7-TETRAHYDROPYRIMIDINE-5,7-DIONES

Viktor Papesch, Morton Grove, Ill., assignor to G. D. Searle & Co., Chicago, Ill., a corporation of Delaware
No Drawing. Filed Aug. 31, 1959, Ser. No. 836,870
3 Claims. (Cl. 260—256.4)

This invention is concerned with novel bicyclic heterocylic compounds and, more particularly, with 2,4,6-trialkylpyrazolo[4,3 - d]-4,5,6,7-tetrahydropyrimidine-5,7-diones of the structural formula

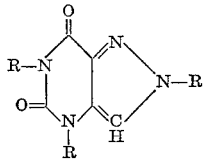

wherein R is a lower alkyl radical containing more than one and less than 5 carbon atoms. Lower alkyl radicals represented by R are exemplified by ethyl, propyl, butyl, and the branched-chain isomers thereof.

The trialkyl compounds of this invention have been found to possess unexpectedly potent anti-inflammatory activity in contrast to the related trimethyl compound. The instant compounds are also diuretic agents.

A suitable starting material for the manufacture of the present compounds is 5,7-dihydroxypyrazolo[4,3-d]pyrimidine. Alkylation of this substance, for example, with an alkyl halide in the presence of a suitable acid acceptor, preferably in an inert ionic solvent, affords the instant pyrimidines. The product can be isolated from the reaction mixture by filtration of the precipitated salts and evaporation of the filtrate. As a specific example of this process, 5,7-dihydroxypyrazolo[4,3-d]pyrimidine is treated with ethyl iodide in acetone in the presence of potassium carbonate, resulting in 2,4,6-triethylpyrazolo[4,3-d]tetrahydropyramidine-5,7-dione.

The invention will appear more fully from the examples which follow. These examples are set forth by way of illustration only and it will be understood that the invention is not be construed as limited in spirit or in scope by the details contained therein, as many modifications in materials and methods will be apparent from this disclosure to those skilled in the art. In these examples temperatures are given in degrees centigrade (° C.). Quantities of materials are expressed in parts by weight unless otherwise noted.

Example 1

A mixture of 3 parts of 5,7-dihydroxypyrazolo[4,3-d]pyrimidine, 96.7 parts of ethyl iodide, 55 parts of potassium carbonate, and 200 parts of acetone is heated at reflux with stirring for about 16 hours. The reaction mixture is filtered to remove inorganic salts and the filtrate evaporated to dryness in vacuo. The residue is extracted with chloroform and this extract concentrated to dryness. Adsorption of this residue on silica gel followed by washing of the column with benzene and with ethyl acetate-benzene mixtures and finally elution with 35% ethyl acetate in benzene affords material which, after a second chromatographic purification, results in 2,4,6-triethylpyrazolo[4,3 - d] - 4,5,6,7-tetrahydropyrimidine-5,7-dione. Recrystallization from ethanol yields the pure substance, M.P. 152–154°.

Example 2

A mixture of 1.5 parts of 5,7-dihydroxypyrazolo[4,3-d]pyrimidine, 66.7 parts of n-butyl iodide, 27.5 parts of potassium carbonate, and 150 parts of acetone is heated at reflux with stirring for about 24 hours. The reaction mixture is filtered and the filtrate concentrated to dryness. The residue is adsorbed on silica gel and eluted with an ethyl acetate-benzene solution. Recrystallization from ethanol affords pure 2,4,6-tri-n-butylpyrazolo[4,3-d]-4,5, 6,7-tetrahydropyrimidine-5,7-dione.

What is claimed is:
1. A compound of the structural formula

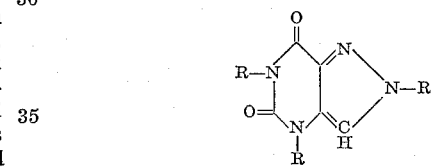

wherein R is a lower alkyl radical containing more than one and less than five carbon atoms.

2. 2,4,6 - triethylpyrazolo[4,3 - d] - 4,5,6,7 - tetrahydropyrimidine-5,7-dione.

3. 2,4,6 - tri - n - butylpyrazolo[4,3 - d]-4,5,6,7-tetrahydropyramidine-5,7-dione.

References Cited in the file of this patent

Fieser et al.: "Organic Chemistry," 3rd Ed., pages 30–31 (1956).
Robins et al.: Journ. Am. Chem. Soc., vol. 78, pp. 2418–2422 (1956).